United States Patent
Yoon

(10) Patent No.: US 6,568,748 B2
(45) Date of Patent: May 27, 2003

(54) APPARATUS FOR FIXING ROOF RACK TO VEHICLE ROOF

(75) Inventor: Jin Yoon, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/028,287

(22) Filed: Dec. 28, 2001

(65) Prior Publication Data

US 2003/0038510 A1 Feb. 27, 2003

(30) Foreign Application Priority Data

Aug. 22, 2001 (KR) .................................... 2001-0050603

(51) Int. Cl.[7] ............................................... B60R 9/058
(52) U.S. Cl. ...................... 296/210; 296/37.7; 224/314; 224/321
(58) Field of Search ........................... 296/210, 216.06, 296/216.09, 216.07, 213, 37.1, 37.7; 224/309, 327, 325, 509, 556, 322, 323, 314, 321, 326, 324

(56) References Cited

U.S. PATENT DOCUMENTS

| | | | |
|---|---|---|---|
| 4,473,178 A | * 9/1984 | Bott | 224/324 |
| 4,767,040 A | * 8/1988 | Miller et al. | 224/326 |
| 5,002,216 A | * 3/1991 | Gerber | 224/329 |
| 5,016,798 A | * 5/1991 | Stapleton et al. | 224/326 |
| 5,090,605 A | * 2/1992 | Cucheran | 224/321 |
| 5,456,512 A | * 10/1995 | Gibbs et al. | 296/37.7 |
| 5,636,776 A | * 6/1997 | Rak et al. | 224/322 |
| 5,762,247 A | * 6/1998 | Cucheran et al. | 224/321 |
| 5,918,929 A | * 7/1999 | Vagis | 296/210 |
| 5,954,251 A | * 9/1999 | Tress et al. | 224/309 |
| 5,975,391 A | * 11/1999 | Aftanas et al. | 224/309 |
| 6,158,639 A | * 12/2000 | De Silva et al. | 224/321 |
| 6,311,882 B1 | * 11/2001 | Allison et al. | 224/326 |

* cited by examiner

Primary Examiner—D. Glenn Dayoan
Assistant Examiner—G Blankenship
(74) Attorney, Agent, or Firm—Birch, Stewart, Kolasch & Birch, LLP

(57) ABSTRACT

The present invention relates to an apparatus for fixing a roof rack to a vehicle roof. Particularly, the present invention relates to an apparatus for facilitating mounting and dismounting of a roof rack for loading various kinds of freight thereon by structurally improving a vehicle roof to employ a unified single roof molding. According to the present invention, there is provided an apparatus for fixing a roof rack to a vehicle roof of the type comprising a roof panel 100 in which roof molding engagement portions 110 are longitudinally formed to be depressed along both sides of the vehicle roof, and roof moldings 200 inserted into and engaged with the roof molding engagement portions 110 of the roof panel 100. Further, the apparatus of the present invention comprises engagement openings 210 formed to pass through the roof moldings, and movable covers 300 placed in the interiors of the roof moldings to allow the engagement openings 210 to be resiliently opened and closed. Therefore, since the unified single roof molding can be employed by structurally improving the vehicle roof, irrespective of whether or not the roof rack is used, the number of parts and the cost of production can be reduced and production processes can be simplified. Further, since the roof rack can be easily mounted to and dismounted from the roof modling, a user's convenience increases. Furthermore, since the interior of the roof molding cannot be seen when the roof rack has been dismounted from the roof molding, the aesthetic appearance of the vehicle roof can be enhanced.

2 Claims, 5 Drawing Sheets

APPARATUS FOR FIXING ROOF RACK TO VEHICLE ROOF

BACKGROUND OF THE INVENTION

1. Field of the Invention

The present invention relates to an apparatus for fixing a roof rack to a vehicle roof. Particularly, the present invention relates to an apparatus for facilitating mounting and dismounting of a roof rack for loading various kinds of freight thereon by structurally improving a vehicle roof to employ a unified single roof molding, by which the number of parts and the cost of production can be reduced and production processes can be simplified since the unified single roof molding can be employed irrespective of whether or not the roof rack is used, a user's convenience increases since the roof rack can be easily mounted to and dismounted from the roof molding, and the aesthetic appearance of the vehicle roof can be enhanced since the interior of the roof molding cannot be seen when the roof rack has been dismounted therefrom.

2. Description of the Prior Art

Generally, a vehicle roof is provided with roof moldings for preventing welded portions between a roof panel and a side panel from being exposed to the outside. Such a roof molding is also referred to as a roof carrier. In addition, a roof rack for loading various kinds of freight thereon may be mounted to the roof molding.

FIG. 1 is a perspective view of a conventional vehicle roof, FIG. 2 is a perspective view of a conventional apparatus for fixing a roof rack to the vehicle roof, and FIG. 3 is a sectional view taken along line A—A in FIG. 1.

In addition, FIG. 4 is a perspective view of a roof molding of the conventional apparatus for fixing the roof rack to the vehicle roof.

As shown in FIGS. 1 to 4, the conventional apparatus for fixing the roof rack to the vehicle roof comprises a roof panel 10 in which roof molding engagement portions 11 are longitudinally depressed along both sides of the vehicle roof, and roof moldings 20 inserted into and engaged with the roof molding engagement portions 11 of the roof panel 10.

According to the conventional apparatus for fixing the roof rack to the vehicle roof constructed as such, since the integrally formed roof moldings 20 are longitudinally mounted on both sides of the roof panel 10 as shown in FIG. 1, the roof rack 40 cannot be mounted to the roof moldings. On the other hand, since the roof moldings 20 with two or more engagement openings 30 formed therein are mounted on both sides of the roof panel 10 as shown in FIG. 2, the roof rack 40 can be mounted to the roof moldings through the engagement openings 30.

As shown in FIGS. 3 and 4, the roof moldings 20 are inserted into and engaged with the roof molding engagement portions 11 formed to be depressed in the roof panel 10. Each roof molding 20 includes an outer roof molding part 21 made of synthetic resin, and an inner roof molding part 22 made of stainless steel which is inserted into and engaged with an inner circumferential surface of the outer roof molding part 21. The outer roof molding part 21 enhances the aesthetic appearance of the vehicle roof and also prevents foreign matter from being introduced into the roof molding engagement portion 11, while the inner roof molding part 22 serves to maintain the strength of the roof molding 20.

However, in the conventional apparatus for fixing the roof rack to the vehicle roof, different kinds of the roof moldings should be used depending on whether or not the roof rack is used. That is, integral type of roof moldings are used in a vehicle in which the roof rack is not employed, whereas separate type of roof moldings are used in a vehicle in which the roof rack is employed. As a result, a unified roof molding cannot be employed regardless of the kinds of vehicles. Further, since the separate type of roof moldings should be used in a case of the vehicle where the roof rack is used, the number of parts and the cost of production may be increased. Furthermore, there is a technical problem in that the user cannot have an alternative to employing the roof rack according to a user's will.

SUMMARY OF THE INVENTION

The present invention is contemplated to solve the above problems. It is an object of the present invention to provide an apparatus for fixing a roof rack to a vehicle roof, by which the number of parts and the cost of production can be reduced and production processes can be simplified since a unified single roof molding can be employed by structurally improving the vehicle roof, irrespective of whether or not the roof rack is used, a user's convenience increases since the roof rack can be easily mounted to and dismounted from the roof molding, and the aesthetic appearance of the vehicle roof can be enhanced since the interior of the roof molding cannot be seen upon when the roof rack has been dismounted therefrom.

In order to accomplish the above object of the present invention, there is provided an improved apparatus for fixing a roof rack to a vehicle roof of the type comprising a roof panel in which roof molding engagement portions are longitudinally depressed along both sides of the vehicle roof, and roof moldings inserted into and engaged with the roof molding engagement portions of the roof panel. Further, the apparatus of the present invention comprises engagement openings formed to pass through the roof moldings, and movable covers placed in the interiors of the roof moldings to allow the engagement openings to be resiliently opened and closed.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

The constitution of a preferred embodiment of the present invention will be explained in detail with reference to the accompanying drawings.

Figure 1:
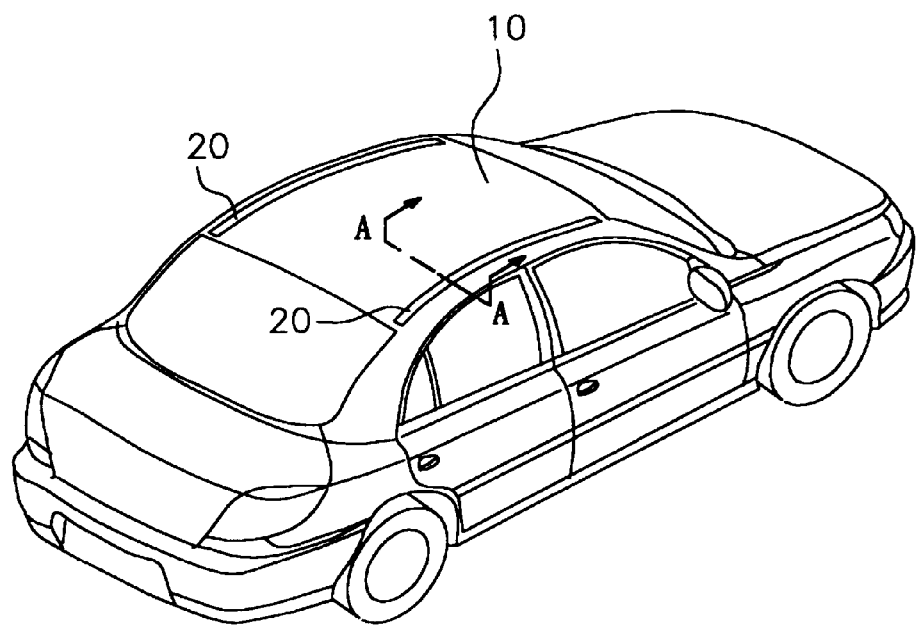
FIG. 1 is a perspective view of a conventional vehicle roof.
Figure 2:
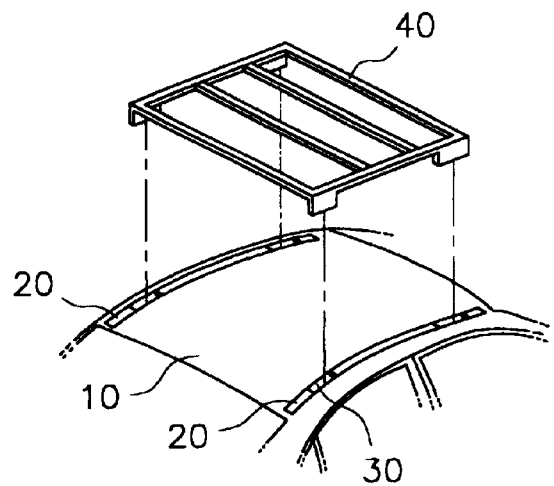
FIG. 2 is a perspective view of a conventional apparatus for fixing a roof rack to the vehicle roof.
Figure 3:
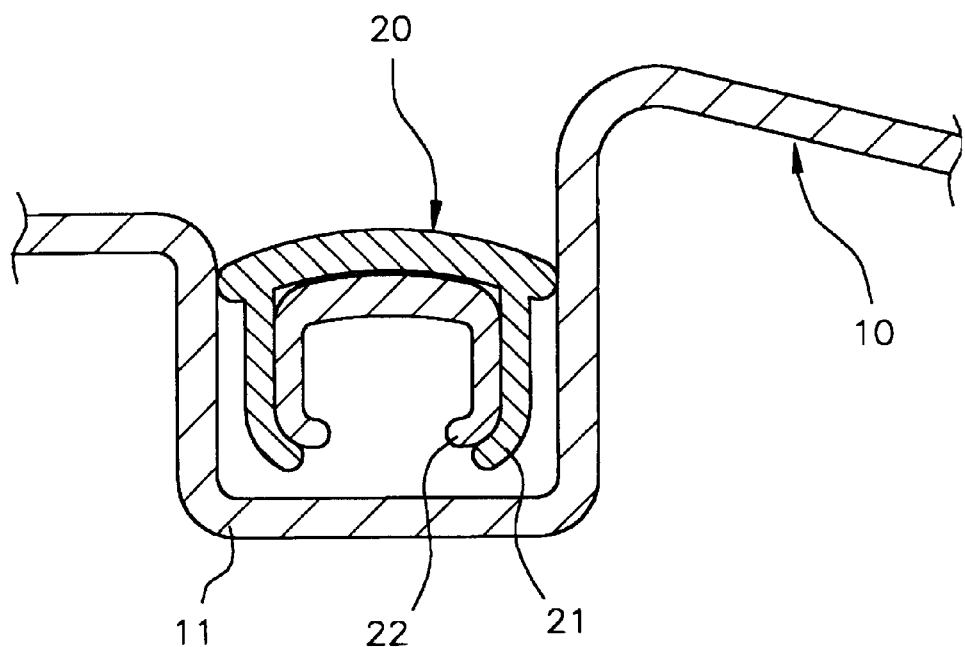
FIG. 3 is a sectional view taken along line A—A in FIG. 1.
Figure 4:
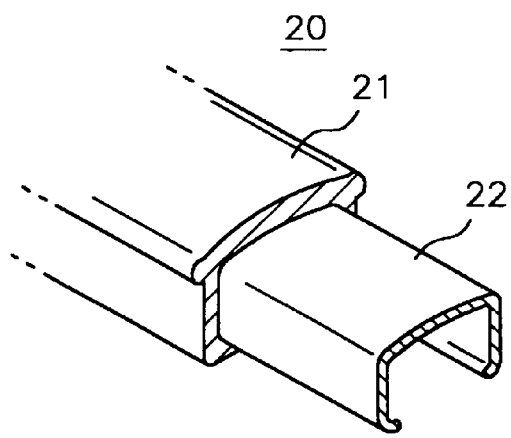
FIG. 4 is a perspective view of a roof molding of the conventional apparatus for fixing the roof rack to the vehicle roof.
Figure 5:
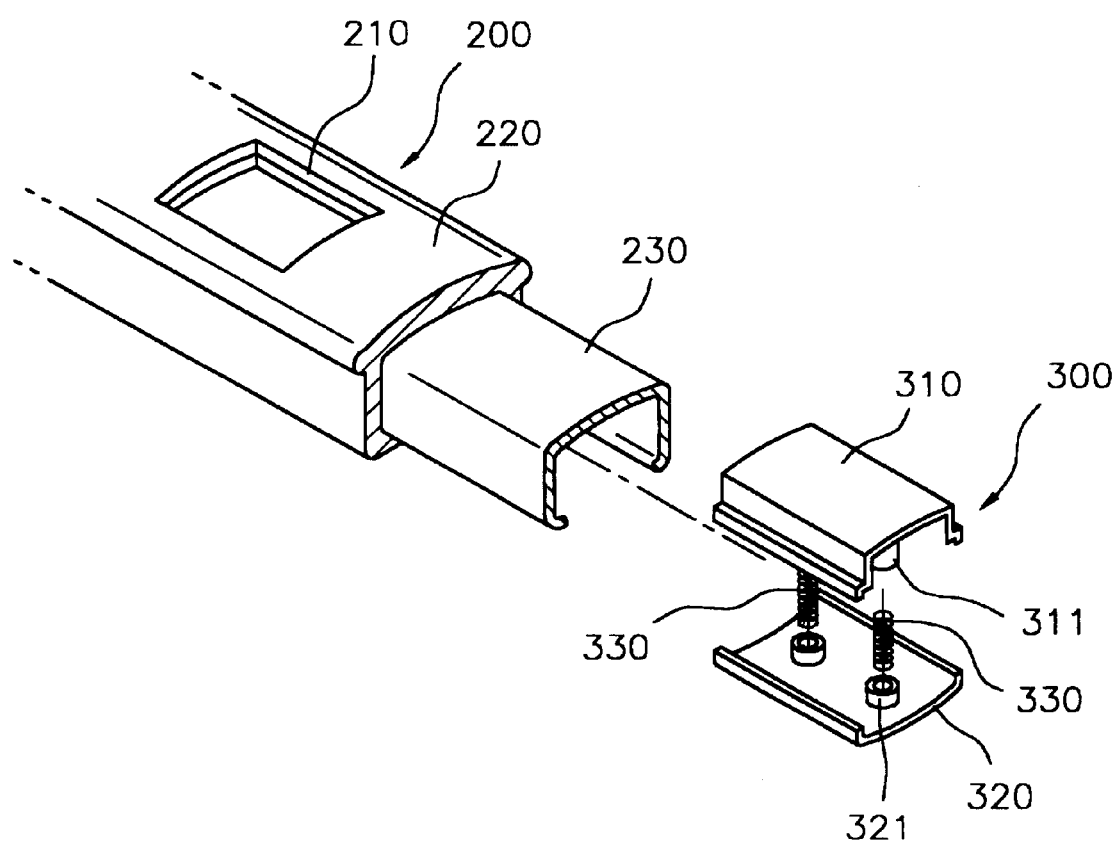
FIG. 5 is an exploded perspective view of an apparatus for fixing a roof rack to a vehicle roof according to the present invention.
Figure 6:
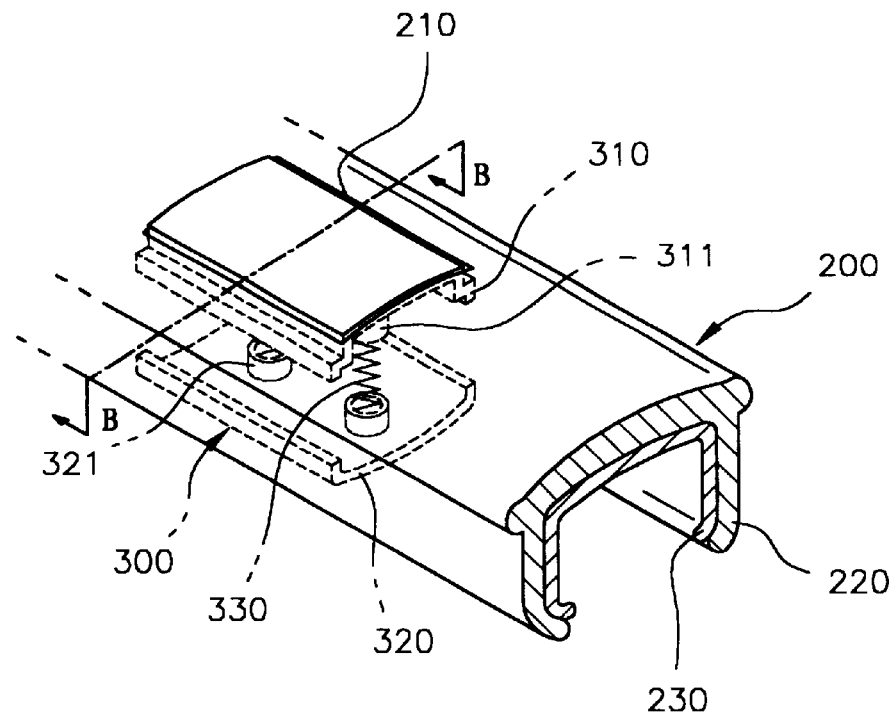
FIG. 6 is a perspective view showing a state where an engagement opening of the apparatus for fixing the roof rack to the vehicle roof according to the present invention is closed by a movable cover.
Figure 7:
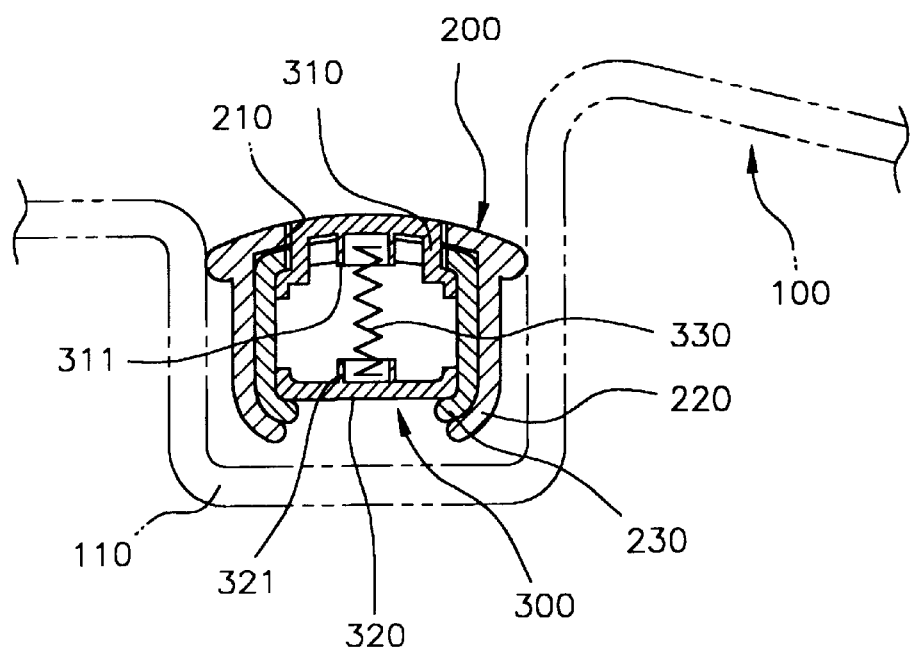
FIG. 7 is a sectional view taken along line B—B in FIG. 6.

FIG. 5 is an exploded perspective view of an apparatus for fixing a roof rack to a vehicle roof according to the present invention, FIG. 6 is a perspective view showing a state where an engagement opening of the apparatus for fixing the roof rack to the vehicle roof according to the present invention is closed by a movable cover, and FIG. 7 is a sectional view taken along line B—B in FIG. 6.

Figure 8:
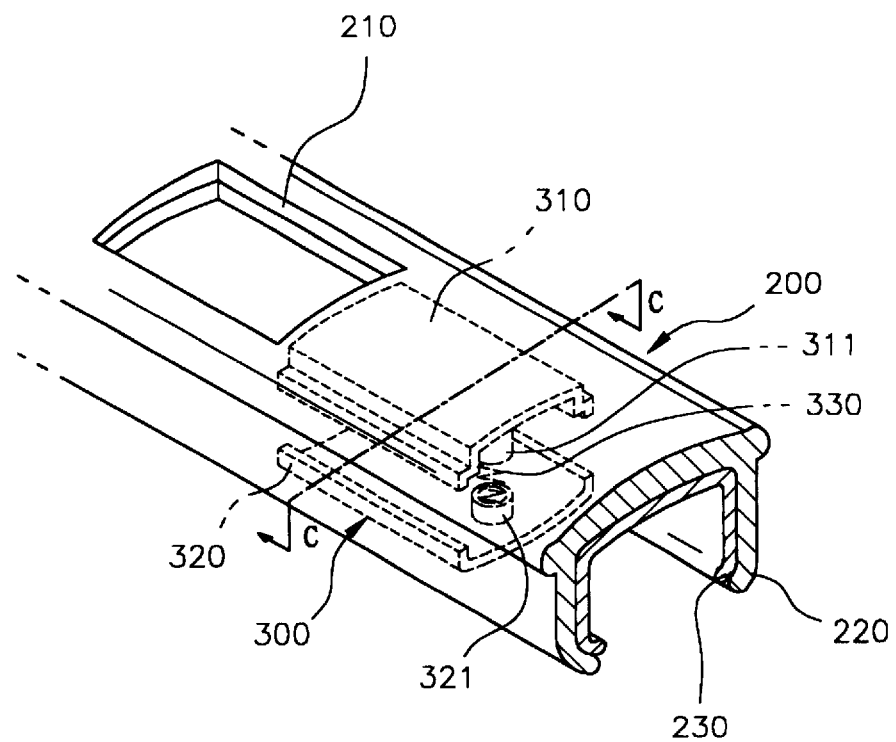
FIG. 8 is a perspective view showing a state where the engagement opening of the apparatus for fixing the roof rack to the vehicle roof according to the present invention is opened.
Figure 9:
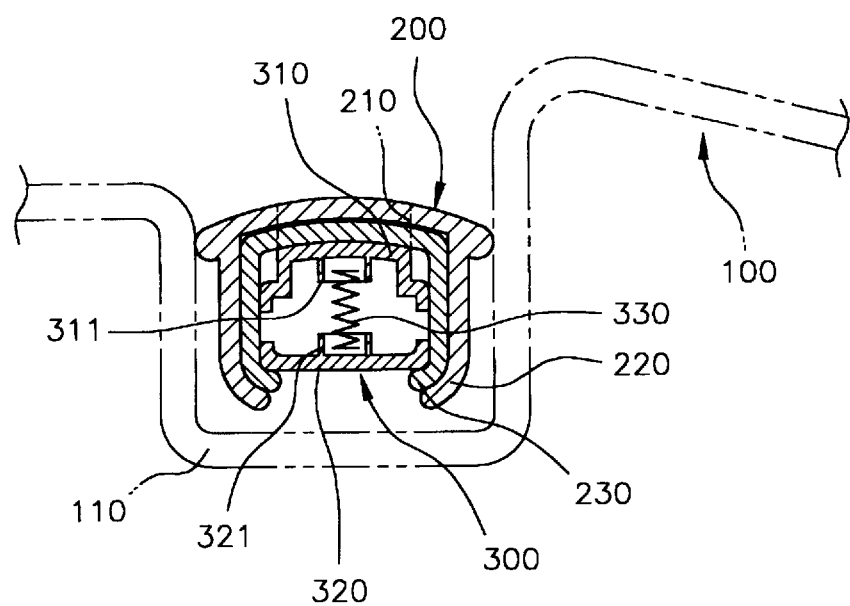
FIG. 9 is a sectional view taken along line C—C in FIG. 8.

Further, FIG. 8 is a perspective view showing a state where the engagement opening of the apparatus for fixing the roof rack to the vehicle roof according to the present invention is opened, and FIG. 9 is a sectional view taken along line C—C in FIG. 8.

As shown in FIGS. 5 to 9, an apparatus for fixing a roof rack to a vehicle roof according to the present invention comprises a roof panel 100 in which roof molding engagement portions 110 are longitudinally depressed along both sides of the vehicle roof, and roof moldings 200 inserted into and engaged with the roof molding engagement portions 110 of the roof panel 100. Further, according to a technical feature of the present invention, the apparatus comprises engagement openings 210 formed to pass through the roof moldings, and movable covers 300 placed in the interiors of the roof moldings 200 to allow the engagement openings 210 to be resiliently opened and closed.

As shown in FIG. 5, each roof molding 200 includes an outer roof molding part 220 and an inner roof molding part 230 inserted into and engaged with an inner circumferential surface of the outer roof molding part 220. The engagement openings 210 formed on the roof molding 200 are formed to correspond to the shape of upper cover parts 310 of the movable covers 300 inserted into the roof molding.

Further, each movable cover 300 is divided into the upper cover part 310, a lower cover part 320 and an elastic member 330. The upper cover part 310 is formed to be bent in a multistage form so that a portion of a top surface thereof protrudes upwardly to be inserted into the engagement opening 210, and is provided with at least one cylindrical upper receiving end 311 formed on a bottom surface thereof for receiving the elastic member. The lower cover part 320 is provided with at least one cylindrical lower receiving end 321 formed on the top surface thereof for receiving the elastic member.

Therefore, both top and bottom ends of the elastic member 330 are inserted into the cylindrical upper receiving end 311 of the upper cover part 310 and the cylindrical lower receiving end 321 of the lower cover part 320, respectively, to resiliently support the movable cover 300 in a vertical direction.

At this time, the movable cover 300, which comprises the upper cover part 310, the lower cover part 320 and the elastic member 330 of which both the ends are inserted, respectively, into the cylindrical upper receiving end 311 of the upper cover part 310 and the cylindrical lower receiving end 321 of the lower cover part 320, is guided into the inner roof molding 230 so that it can move within the roof molding 200 in a fore and aft direction.

Hereinafter, the operation and effects of the present invention will be explained with reference to FIGS. 5 to 9.

As described above, when the movable cover 300 is placed in the engagement opening 210 formed on the roof molding 200, the upper cover part 310 protrudes upwardly by the elastic member 330 of the movable cover 300 to close the engagement opening 210.

Therefore, when the roof rack (not shown) needs not to be mounted to the roof molding 200, as shown in FIGS. 6 and 7, the movable cover 300 is caused to move toward the engagement opening 210 of the roof molding 200. Then, since the upper cover part 310 of the movable cover 300 closes the engagement opening 210 by means of the elastic member 330, the aesthetic appearance of the roof molding can be enhanced.

On the contrary, when the roof rack needs to be mounted to the roof molding 200, the engagement opening 210 of the roof molding 200 is opened since by pressing the upper cover part 310 of the movable cover 300 by which the engagement opening 210 of the roof molding 200 is covered and then moving the movable cover 300 in the fore or aft direction.

As described above, according to the present invention, since the unified single roof molding can be employed by structurally improving the vehicle roof, irrespective of whether or not the roof rack is used, the number of parts and the cost of production can be reduced and production processes can be simplified. Further, since the roof rack can be easily mounted to and dismounted from the roof molding, a user's convenience increases. Furthermore, since the interior of the roof molding cannot be seen when the roof rack has been dismounted from the roof molding, the aesthetic appearance of the vehicle roof can be enhanced.

What is claimed is:

1. An improved apparatus for fixing a roof rack to a vehicle roof comprising a roof panel in which roof molding engagement portions are longitudinally formed to be depressed along both sides of the vehicle roof, and roof moldings inserted into and engaged with the roof molding engagement portions of the roof panel, wherein the improvement comprises:

engagement openings formed to pass through the roof moldings; and movable covers placed in the interiors of the roof moldings to allow the engagement openings to be resiliently opened and closed, wherein each movable cover includes an upper cover part which is bent in a multistage form so that a portion of a top surface thereof protrudes upwardly to be inserted into the engagement opening, and is provided with at least one cylindrical upper receiving end formed on a bottom surface thereof for receiving an elastic member, a lower cover part provided with at least one cylindrical lower receiving end formed on a top surface thereof for receiving the elastic member, and the elastic member with both ends thereof inserted into the cylindrical upper and lower receiving ends, respectively.

2. The apparatus as claimed in claim 1, wherein each roof molding includes an outer roof molding part, and an inner roof molding part inserted into and engaged with an inner circumferential surface of the outer roof molding part.

* * * * *